US010462198B2

(12) United States Patent
Kudo

(10) Patent No.: US 10,462,198 B2
(45) Date of Patent: Oct. 29, 2019

(54) COMMUNICATION METHOD AND STORAGE MEDIUM STORING COMMUNICATION PROGRAM

(71) Applicant: Brother Kogyo Kabushiki Kaisha, Nagoya-shi, Aichi-ken (JP)

(72) Inventor: Yasuhiro Kudo, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 83 days.

(21) Appl. No.: 15/856,144

(22) Filed: Dec. 28, 2017

(65) Prior Publication Data

US 2018/0278661 A1 Sep. 27, 2018

(30) Foreign Application Priority Data

Mar. 22, 2017 (JP) ................................ 2017-055443

(51) Int. Cl.
*H04L 29/06* (2006.01)

(52) U.S. Cl.
CPC ...... *H04L 65/4053* (2013.01); *H04L 65/1083* (2013.01); *H04L 65/403* (2013.01); *H04L 65/1069* (2013.01)

(58) Field of Classification Search
None
See application file for complete search history.

(56) References Cited

U.S. PATENT DOCUMENTS

| 8,279,780 B2 | 10/2012 | Yamamoto |
| 8,488,468 B2 | 7/2013 | Nakajima |

(Continued)

FOREIGN PATENT DOCUMENTS

| JP | H09-293059 A | 11/1997 |
| JP | 2000-322350 A | 11/2000 |

(Continued)

OTHER PUBLICATIONS

Sep. 25, 2018—(JP) Office Action—App 2017-055443, Eng Tran.
Mar. 19, 2019—(JP) Office Action—App 2017-055443, Eng Tran.

*Primary Examiner* — Chi H Pham
*Assistant Examiner* — Vladislav Y Agureyev
(74) *Attorney, Agent, or Firm* — Banner & Witcoff, Ltd.

(57) ABSTRACT

A communication method includes: executing a first conference process for performing a teleconference; connecting first and second clients with the first conference process; after connecting the clients with the first conference process, performing the teleconference between the clients through the first conference process, based on first information; after connecting the clients with the first conference process, transmitting an addition request for activating a second conference process from the first conference process to a server; in response to receiving the addition request, activating the second conference process; synchronizing first and second information; after synchronizing, transmitting a switching instruction from the first conference process to the second client; in response to receiving the switching instruction, connecting the second client with the second conference process; and after connecting the second client with the second conference process, performing the teleconference by the second client through the second conference process, based on the second information.

11 Claims, 9 Drawing Sheets

(56) References Cited

U.S. PATENT DOCUMENTS

| | | | |
|---|---|---|---|
| 8,929,257 B1* | 1/2015 | Goepp | H04L 65/1076 |
| | | | 370/260 |
| 9,137,187 B1* | 9/2015 | Goepp | H04L 51/12 |
| 2010/0007713 A1 | 1/2010 | Yamamoto | |
| 2011/0280128 A1 | 11/2011 | Nakajima | |
| 2012/0188893 A1* | 7/2012 | Amano | H04L 43/10 |
| | | | 370/252 |
| 2014/0019549 A1* | 1/2014 | Wei | H04M 3/567 |
| | | | 709/204 |
| 2014/0029474 A1* | 1/2014 | Bhagavatula | H04L 65/1093 |
| | | | 370/260 |
| 2017/0019437 A1* | 1/2017 | Phadnis | H04L 65/1083 |
| 2017/0052755 A1* | 2/2017 | Miki | G06Q 10/10 |
| 2018/0027030 A1 | 1/2018 | Homma et al. | |
| 2018/0284957 A1* | 10/2018 | Afsari | H04L 65/403 |

FOREIGN PATENT DOCUMENTS

| | | |
|---|---|---|
| JP | 2006-18643 A | 1/2006 |
| JP | 2008-34900 A | 2/2008 |
| JP | 2008-71156 A | 3/2008 |
| JP | 2010-021678 A | 1/2010 |
| JP | 2010-141788 A | 6/2010 |
| JP | 2013-243442 A | 12/2013 |
| JP | 2014-072657 A | 4/2014 |
| JP | 2016-171374 | 9/2016 |
| WO | 2010/004897 A1 | 1/2010 |

\* cited by examiner

FIG. 2

CONFERENCE PROCESS 621A

| CONFERENCE PROCESS/ CLIENT ID | APPARATUS TYPE | IP ADDRESS |
|---|---|---|
| 3A | CLIENT | 10.101.0.5:30312 |
| 3B | CLIENT | 10.102.2.100:39832 |
| 3C | CLIENT | 10.101.99.11:40982 |
| 621B | SERVER | 10.0.0.3:12001 |
| 621C | SERVER | 10.0.0.2:10011 |

| CLIENT ID | CONFERENCE PROCESS ID | APPLICATION TYPE |
|---|---|---|
| 3A | 621A | Windows Client v. 1.1 |
| 3B | 621A | Windows Client v. 1.0 |
| 3C | 621A | iOS Client v. 1.2 |
| 3D | 621B | Android Client v. 1.0 |
| 3E | 621B | Windows Client v. 1.0 |
| 3F | 621C | Windows Client v. 1.1 |

CONFERENCE PROCESS 621B

| CONFERENCE PROCESS/ CLIENT ID | APPARATUS TYPE | IP ADDRESS |
|---|---|---|
| 3D | CLIENT | 10.101.3.10:35122 |
| 3E | CLIENT | 10.102.4.100:65948 |
| 621A | SERVER | 10.0.0.3:11241 |
| 621C | SERVER | 10.0.0.2:10011 |

| CLIENT ID | CONFERENCE PROCESS ID | APPLICATION TYPE |
|---|---|---|
| 3A | 621A | Windows Client v. 1.1 |
| 3B | 621A | Windows Client v. 1.0 |
| 3C | 621A | iOS Client v. 1.2 |
| 3D | 621B | Android Client v. 1.0 |
| 3E | 621B | Windows Client v. 1.0 |
| 3F | 621C | Windows Client v. 1.1 |

COMMUNICATION METHOD AND STORAGE MEDIUM STORING COMMUNICATION PROGRAM

CROSS REFERENCE TO RELATED APPLICATIONS

This application claims priority from Japanese Patent Application No. 2017-055443 filed Mar. 22, 2017. The entire content of the priority application is incorporated herein by reference.

TECHNICAL FIELD

This disclosure relates to a communication method for realizing a teleconference by performing communication through a network, and relates to a storage medium storing a communication program.

BACKGROUND

A system that uses a multi-point control unit (MCU) to perform a teleconference is known. In such system, a technique of switching the MCU controlling a specific conference room to another MCU has been proposed.

SUMMARY

According to a first aspect, this specification discloses a communication method for performing a teleconference between clients through a server. The communication method includes: executing, by the server, a first conference process that is a conference process for performing the teleconference; connecting each of first and second clients with the first conference process; after connecting each of the first and second clients with the first conference process, performing the teleconference between the first client and the second client through the first conference process, based on first information relating to a conference process and a client that perform communication with the first conference process; after connecting each of the first and second clients with the first conference process, transmitting an addition request from the first conference process to the server, the addition request being for activating a second conference process different from the first conference process; in response to receiving the addition request, activating the second conference process by the server; synchronizing the first information with second information, the second information relating to a conference process and a client that perform communication with the second conference process; after synchronizing the first information with the second information, transmitting a switching instruction from the first conference process to the second client, the switching instruction being for switching a connection destination from the first conference process to the second conference process; in response to receiving the switching instruction, connecting the second client with the second conference process; and after connecting the second client with the second conference process, performing the teleconference by the second client through the second conference process, based on the second information.

According to a second aspect, this specification also discloses a non-transitory computer-readable storage medium storing a communication program. The communication program is executable on a computer of a server that performs a teleconference between clients. The communication program causes, when executed, the server to perform operations including: executing a first conference process that is a conference process for performing the teleconference; connecting each of first and second clients with the first conference process; after connecting each of the first and second clients with the first conference process, performing the teleconference between the first client and the second client through the first conference process, based on first information relating to a conference process and a client that perform communication with the first conference process; after connecting each of the first and second clients with the first conference process, transmitting an addition request from the first conference process, the addition request being for activating a second conference process different from the first conference process; in response to receiving the addition request, activating the second conference process; synchronizing the first information with second information, the second information relating to a conference process and a client that perform communication with the second conference process; after synchronizing the first information with the second information, transmitting a switching instruction from the first conference process to the second client, the switching instruction being for switching a connection destination from the first conference process to the second conference process; in response to receiving the switching instruction, connecting the second client with the second conference process; and after connecting the second client with the second conference process, performing the teleconference by the second client through the second conference process, based on the second information.

BRIEF DESCRIPTION OF THE DRAWINGS

Embodiments in accordance with this disclosure will be described in detail with reference to the following figures wherein:

FIG. 2 is a diagram showing tables 221, 222;

DETAILED DESCRIPTION

Figure 1:
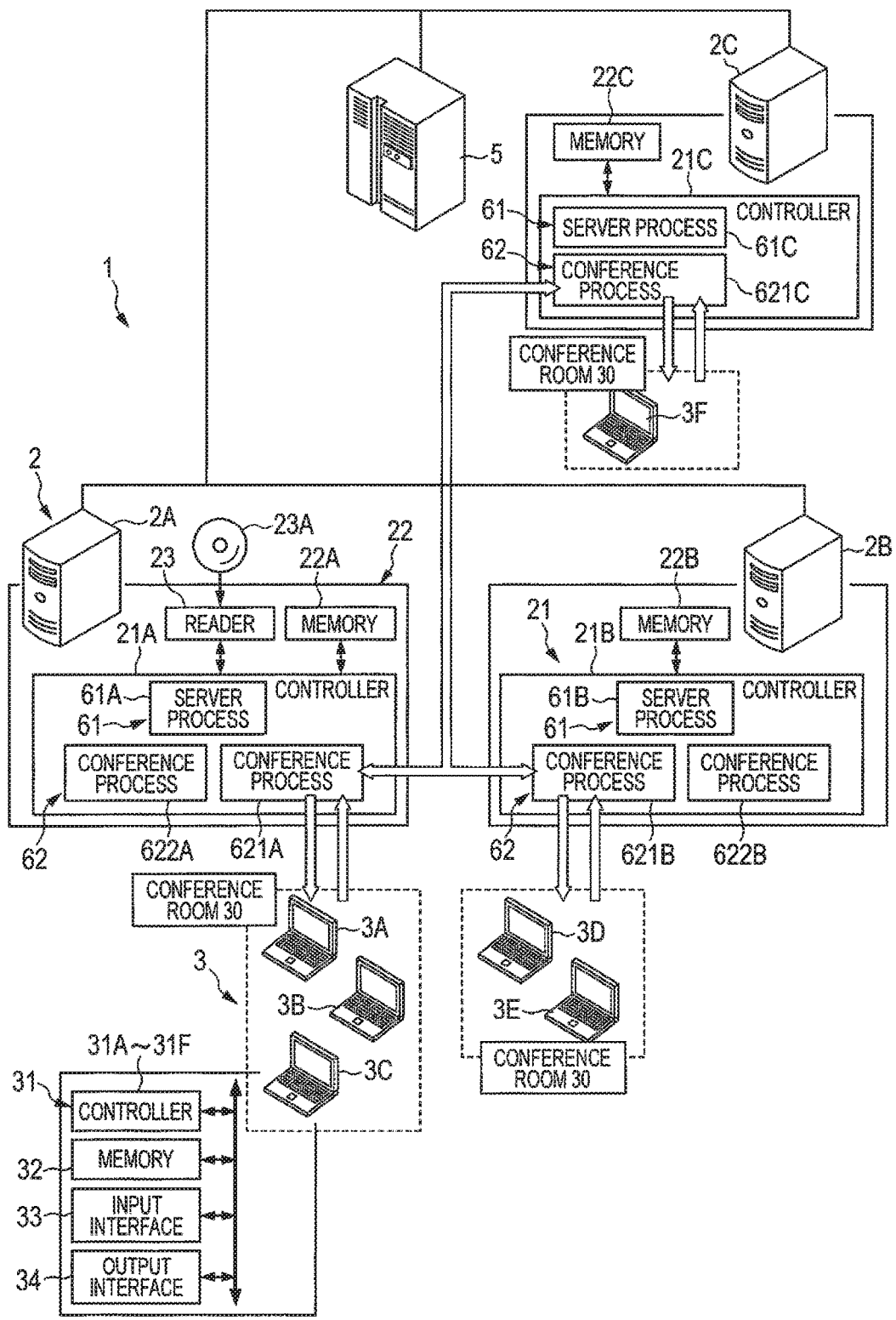
FIG. 1 is a diagram showing an overview of a communication system 1.

For example, a known video conference system includes a first operation support server, a second operation support server, and a base PC. In this system, the base PC performs communication by connecting to the first operation support server that is in an operation state. Thereby, the base PC stores live camera information in the first operation support server, and at the same time, reads the stored live camera information and displays the information on a viewer. The second operation support server in a standby state receives the live camera information stored in the first operation support server and stores the information. When communication between the base PC and the first operation support server is not available, the base PC performs communication by connecting to the second operation support server. That is, the second operation support server becomes the operation state and the first operation support server becomes the standby state. Because the live camera information stored in the first operation support server and the live camera information stored in the second operation support server are synchronized, the base PC reads the live camera information stored in the second operation support server and displays the information in the viewer to continue the conference smoothly.

There is a demand to perform one teleconference by a plurality of MCUs simultaneously. On the other hand, in the above-described technique, one operation support server in an operation state is set. In addition, actions of storing live camera information in the operation support server in a standby state by a base PC, and reading the live camera information from the operation support server in the standby state are prohibited. In this case, there is a problem that one teleconference cannot be performed by a plurality of MCUs simultaneously.

An aspect of this disclosure is to provide a communication method and a communication program capable of performing one teleconference by a plurality of MCUs simultaneously.

<Overview of Communication System 1>

A communication system 1 will be described with reference to FIG. 1. The communication system 1 includes conference servers 2A, 2B, 2C (collectively referred to as a "conference server 2"), clients 3A to 3F (collectively referred to as a "client 3"), and a database server 5 (referred to as a "DB server 5"). The conference server 2, the client 3, and the DB server 5 are connected to each other through a network not shown (such as a LAN and the Internet).

The client 3 performs communication with the conference server 2 to participate in a virtual conference room (simply referred to as a "conference room") and perform a teleconference. The client 3 is configured by installation of a program of a teleconference application to a known personal computer (referred to as a "PC"). The client 3 has a controller 31, a memory 32, an input interface 33, and an output interface 34. The controller 31 takes charge of the overall control by the client 3. The controllers 31 of the clients 3A to 3F are referred to as controllers 31A to 31F. The memory 32 stores various types of programs executed by the controller 31. The input interface 33 includes a camera, a microphone, a keyboard, a mouse, and so on. The output interface 34 includes an LCD, a speaker, and so on.

The conference server 2 performs a conference room and makes the client 3 participate in the conference room to perform a teleconference among the clients 3. The conference server 2 is configured by installation of a program of a dedicated application to a multi-point control unit (referred to as an "MCU") or a known server. The conference server 2 has a controller 21, a memory 22, and a reader 23. The controller 21 takes charge of the overall control by the conference server 2. The controllers 21 of the conference servers 2A, 2B, 2C are referred to as controllers 21A, 21B, 21C. The memory 22 stores various types of programs executed by the controller 21. The memory 22 stores tables 221, 222 (see FIG. 2) described later. The memories 22 of the conference servers 2A, 2B, 2C are referred to as memories 22A, 22B, 22C. The reader 23 reads information stored in a storage medium 23A such as a semiconductor memory and an optical disc. The controller 21 controls the reader 23 to read a program stored in the storage medium 23A and stores the program in the memory 22. The program, for example, may be downloaded from another server connected to the network not shown and stored in the memory 22. In FIG. 1, the readers 23 of the conference server 2B and 2C are omitted.

The DB server 5 manages participation authority of the client 3 for the conference rooms performed by the conference servers 2A to 2C, respectively. The DB server 5 determines whether the client 3 has the authority to participate in the conference room, in response to a request from the conference server 2. The DB server 5 returns a determination result to the conference server 2. A memory not shown of the DB server 5 stores a participation authority DB. As the participation authority DB, client IDs of the clients 3 having the participation authority for the conference room is stored for each conference room ID of the conference room. The participation authority DB may be managed by an administrator, or, for example, may be created automatically by regular communication with the conference server 2.

<Executable File Executed by Conference Server 2>

The controller 21 of the conference server 2 performs following processes (1) and (2), in order to perform the teleconference among the clients 3. The process refers to an execution unit of a program installed in the conference server 2. Each process is activated by execution of an executable file stored in the memory 22.

(1) Server Process 61

A server process 61 is always executed by the controller 21. The server process 61 achieves a function of forwarding media data (hereinafter, referred to as "conference data") transmitted and received when the client 3 performs the teleconference. The server process 61 executes a conference process 62 (described later) when needed. The server process 61 causes another server process 61 to perform the conference process 62. The server process 61 performs communication with the client 3, another server process 61, and the conference process 62.

For example, in FIG. 1, a server process 61A is executed by the controller 21A of the conference server 2A, a server process 61B is executed by the controller 21B of the conference server 2B, and a server process 61C is executed by the controller 21C of the conference server 2C.

(2) Conference Process 62

The conference process 62 is executed by the server process 61. The conference process 62 performs communication with the client 3, the server process 61, and other conference processes 62. The conference process 62 functions as a conference server in the teleconference. The conference process 62 performs the conference room and allows the client 3 to participate in the conference room and perform the teleconference.

For example, in FIG. 1, conference processes 621A, 622A are executed by the controller 21A of the conference server 2A. Conference processes 621B, 622B are executed by the controller 21B of the conference server 2B. A conference process 621C is executed by the controller 21C of the conference server 2C. In this way, the controllers 21 of the conference server 2 execute the plurality of conference processes 62 simultaneously. Although details are described later, the plurality of conference processes 62 can perform separate conference rooms, and the plurality of conference processes 62 can perform a common conference room 30.

When performing the teleconference among the clients 3A, 3B, 3C, the conference process 621A executed by the controller 21A of the conference server 2A connects a session with each of the clients 3A to 3C. Thereby, the conference process 621A performs communication of the conference data through the sessions with the clients 3A to 3C. In an example shown in FIG. 1, sessions are further connected between the conference process 621B executed by the controller 21B of the conference server 2B and the clients 3D, 3E. A session is connected between the conference process 621C executed by the controller 21C of the conference server 2C and the client 3F.

Also, the conference process 62 connects sessions with other conference processes 62 to perform communication of the conference data with other conference processes 62. For example, as shown in FIG. 1, the conference process 621A executed by the controller 21A of the conference server 2A connects sessions with the conference process 621B executed by the controller 21B of the conference server 2B and the conference process 621C executed by the controller 21C of the conference server 2C. In this case, the conference processes 621A, 621B, and 621C relay the conference data transmitted and received among the clients 3A to 3C having the sessions connected with the conference process 621A, the clients 3D, 3E having the sessions connected with the conference process 621B, and the client 3F having the session connected with the conference process 621C.

A communication between the processes of the conference server 2 described below corresponds to exchange of data between processes and is different from actual communication through a network. Hereinafter, the exchange of data between the processes of the conference server 2 is referred to as "transmitting and receiving of data".

<Tables 221, 222>

Tables 221, 222 stored in the memory 22 of the conference server 2 will be described with reference to FIG. 2. The tables 221, 222 are created and managed by the conference process 62. FIG. 2 shows tables 221A, 222A stored in the memory 22A of the conference server 2A and tables 221B, 222B stored in the memory 22B of the conference server 2B. The tables 221A, 222A are created by the conference process 621A. The tables 221B, 222B are created by the conference process 621B.

The table 221 stores information on other conference processes 62 and clients 3 that have a session directly connected with the conference process 62. The table 221 stores a conference process ID or a client ID, an apparatus type, and an IP address, in association with each other. The conference process ID indicates the conference process 62 with which a session is directly connected. The client ID indicates the client 3 with which a session is directly connected. The apparatus type is information indicating a server or a client. The IP address is address information on the conference server 2 in which the conference process 62 indicated by the corresponding conference process ID is executed or on the client 3 indicated by the corresponding client ID.

For example, in FIG. 1, the conference process 621A connects sessions with the clients 3A, 3B, 3C and the conference processes 621B, 621C. Therefore, as shown in FIG. 2, the table 221A stored in the memory 22A stores the clients ID "3A to 3C" of the clients 3A to 3C, respectively. In addition, the "client" indicating the apparatus type of the client 3 is stored in association with the client IDs "3A to 3C". Further, the IP addresses of the clients 3A to 3C are stored in association with the client IDs "3A to 3C". The table 221A stores the conference process IDs "621B", "621C" of the conference processes 621B, 621C. In addition, "server" indicating the apparatus type of the conference servers 2B, 2C in which the conference processes 621B, 621C are executed are stored in association with the IDs "621B", "621C". Further, the IP addresses of the conference servers 2B, 2C in which the conference processes 621B, 621C are executed are stored in association with the IDs "621B", "621C".

The table 222 stores information on the clients 3 that perform communication with the conference process 62 directly or through other conference processes 62. The table 222 stores the client ID, the conference process ID, and the application type in association with each other. The client ID indicates the client 3 that performs communication directly or through other conference processes 62. The conference process ID indicates the conference process 62 that has a session directly connected with the client 3 indicated by the corresponding client ID. The application type indicates the type of a teleconference application installed in the client 3 indicated by the corresponding client ID.

For example, in FIG. 1, because the conference process 621A directly connects a session with the clients 3A to 3C, the conference process 621A performs communication directly. The conference process 621A performs communication with the clients 3D, 3E that have the session connected with the conference process 621B, through the conference process 621B. The conference process 621A performs communication with the client 3F that has the session connected with the conference process 621C, through the conference process 621C.

Therefore, as shown in FIG. 2, the table 222A stored in the memory 22A stores the client IDs "3A to 3F" of the clients 3A to 3F. In addition, a conference process ID "621A" of the conference process 621A that has the sessions directly connected with the clients 3A to 3C is stored in association with the client IDs "3A to 3C". Further, the application type of the teleconference applications installed in the clients 3A to 3C is stored in association with the client IDs "3A to 3C". The table 222A stores the client IDs "3D, 3E" of the clients 3D, 3E. In addition, a conference process ID "621B" of the conference process 621B that has the sessions directly connected with the clients 3D, 3E is stored in association with the client IDs "3D, 3E". Further, the application type of the teleconference application installed in the clients 3D, 3E is stored in association with the client IDs "3D, 3E". In addition, a conference process ID "621C" of the conference process 621C that has the session directly connected with the client 3F is stored in association with the client ID "3F". Further, the application type of the teleconference application installed in the client 3F is stored in association with the client ID "3F".

Hereinafter, the tables 221A, 222A stored in the memory 22A of the conference server 2A by communication performed by the conference process 621A are referred to as "tables 221A, 222A of the conference process 621A", respectively. The tables 221B, 222B stored in the memory 22B of the conference server 2B by communication performed by the conference process 621B are referred to as "tables 221B, 222B of the conference process 621B", respectively. Descriptions of the tables 221B, 222B of the conference process 621B are omitted in FIG. 2.

<Overview of First Communication Sequence (Load Balancing)>

Figure 3:
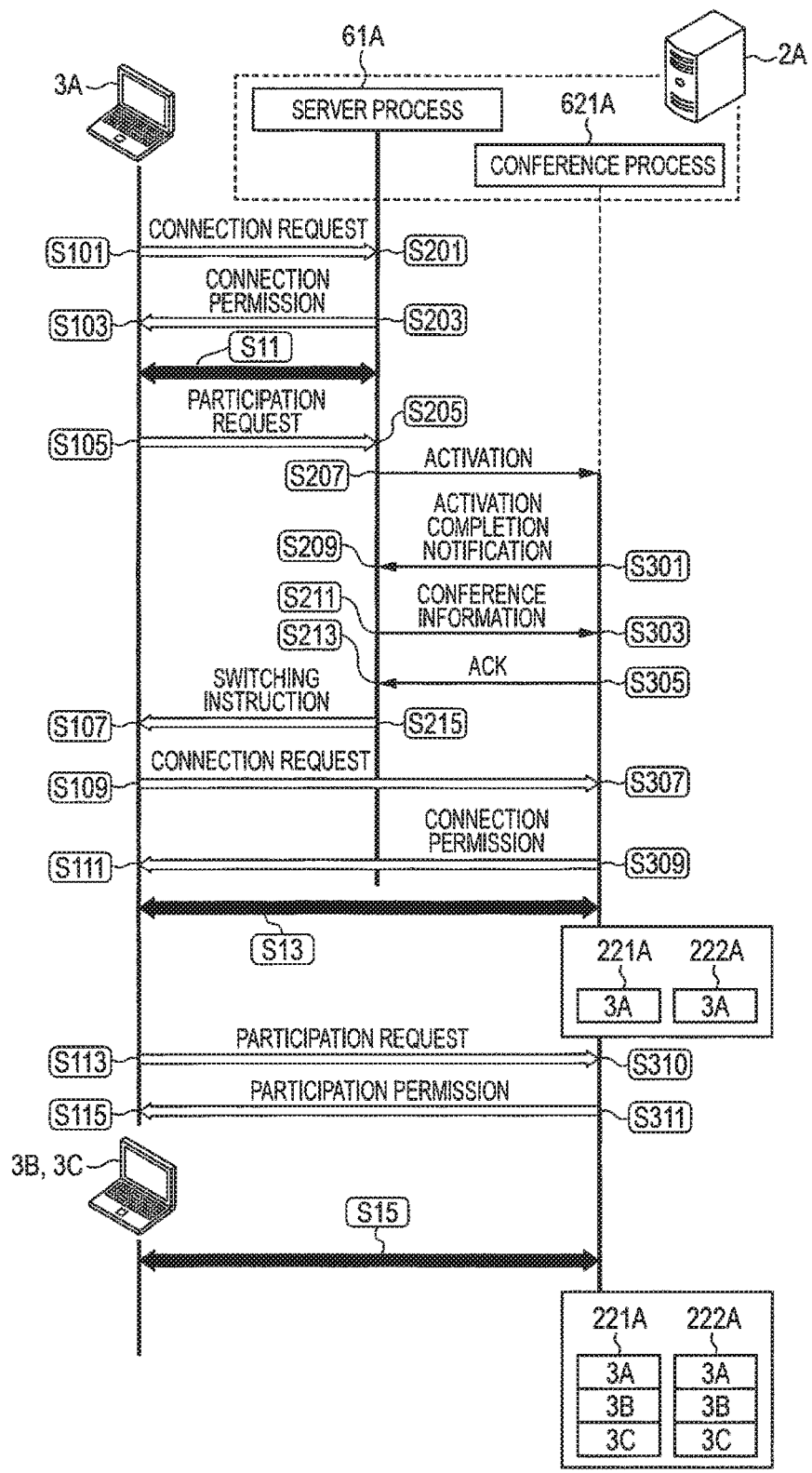
FIG. 3 is a diagram showing a first communication sequence.

A first communication sequence will be described with reference to FIGS. 3 to 5. In the first communication sequence, a case where the conference room 30 (see FIG. 1)

is performed and held in response to a request from the client 3A (see FIG. 1) will be described in detail as an example.

The controller 31A of the client 3A transmits a connection request for requesting the connection of the session with the server process 61A of the conference server 2A, to the server process 61A (S101). The server process 61A receives the connection request (S201). When permitting the connection of the session with the client 3A, the server process 61A transmits connection permission for permitting the connection of the session, to the client 3A (S203). The controller 31A of the client 3A receives the connection permission (S103). Thereby, the session between the client 3A and the server process 61A is connected (S11).

The controller 31A of the client 3A transmits a participation request for requesting participation in the conference room 30, to the server process 61A with which the session is connected (S105). The server process 61A receives the participation request (S205). The server process 61A activates the conference process 621A that performs the conference room 30 (S207).

The conference process 621A transmits an activation completion notification for notifying the completion of the activation, to the server process 61A after being activated (S301). The server process 61A receives the activation completion notification (S209). The server process 61A transmits conference information required for performing the conference room 30, to the conference process 621A (S211). The conference information includes a conference ID "30" indicating the conference room 30, setting information on the conference room 30, and client information (the client ID, the IP address, and so on) on the client 3A that requests participation in the conference room 30. The conference process 621A receives the conference information (S303). The conference process 621A performs setting processing based on the conference information so that the conference room 30 can be performed. The conference process 621A transmits acknowledgement (ACK) for notifying that the setting processing is completed, to the server process 61A (S305). The server process 61A receives the ACK (S213).

The server process 61A transmits a switching command for switching a connection destination of the session of the client 3A from the server process 61A to the conference process 621A, to the client 3A (S215). The controller 31A of the client 3A receives the switching command (S107). The controller 31A transmits a connection request for requesting the connection with the conference process 621A, to the conference process 621A (S109). The conference process 621A receives the connection request (S307). When permitting the connection of the session with the client 3A, the conference process 621A transmits connection permission for permitting the connection of the session, to the client 3A (S309). The controller 31A of the client 3A receives the connection permission (S111). Thereby, the session between the client 3A and the conference process 621A is connected (S13). After the session between the client 3A and the conference process 621A is connected, the session between the server process 61A and the client 3A may be disconnected.

The conference process 621A associates the client ID "3A" of the client 3A with which the session is connected, the apparatus type "client", and the IP address of the client 3A, with each other, and stores the associated information in the table 221A. The conference process 621A associates the client ID "3A" of the client 3A with which the session is connected, the conference process ID "621A" of the conference process 621A, and the application type of the client 3A, with each other, and stores the associated information in the table 222A. In the table 221A in FIG. 3, only the conference process ID/client ID among items in the table 221A in FIG. 2 is indicated. In the table 222A in FIG. 3, only the client ID among items in the table 222A in FIG. 2 is indicated. The same goes for FIG. 4 and FIG. 5.

The controller 31A of the client 3A transmits a participation request for requesting participation in the conference room 30, to the conference process 621A (S113). The conference process 621A receives the participation request (S310). When permitting the participation in the conference room 30 by the client 3A, the conference process 621A transmits participation permission to the client 3A (S311). The controller 31A of the client 3A receives the participation permission (S115). Thereby, the client 3A participates in the conference room 30 performed by the conference process 621A.

The clients 3B, 3C (see FIG. 1) connect with the conference process 621A through the similar procedures in order to participate in the conference room 30 (S15). Thereby, the sessions between the conference process 621A and the clients 3A to 3C are connected (see FIG. 1). The conference process 621A associates the client IDs "3B", "3C" of the clients 3B, 3C with which the sessions are connected, the apparatus type "client", and the IP addresses of the clients 3B, 3C, and stores the associated information in the table 221A. The conference process 621A associates the client IDs "3B", "3C" of the clients 3B, 3C with which the sessions are connected, the conference process ID "621A" of the conference process 621A, and the application type of the clients 3B, 3C, and stores the associated information in the table 222A.

Figure 4:
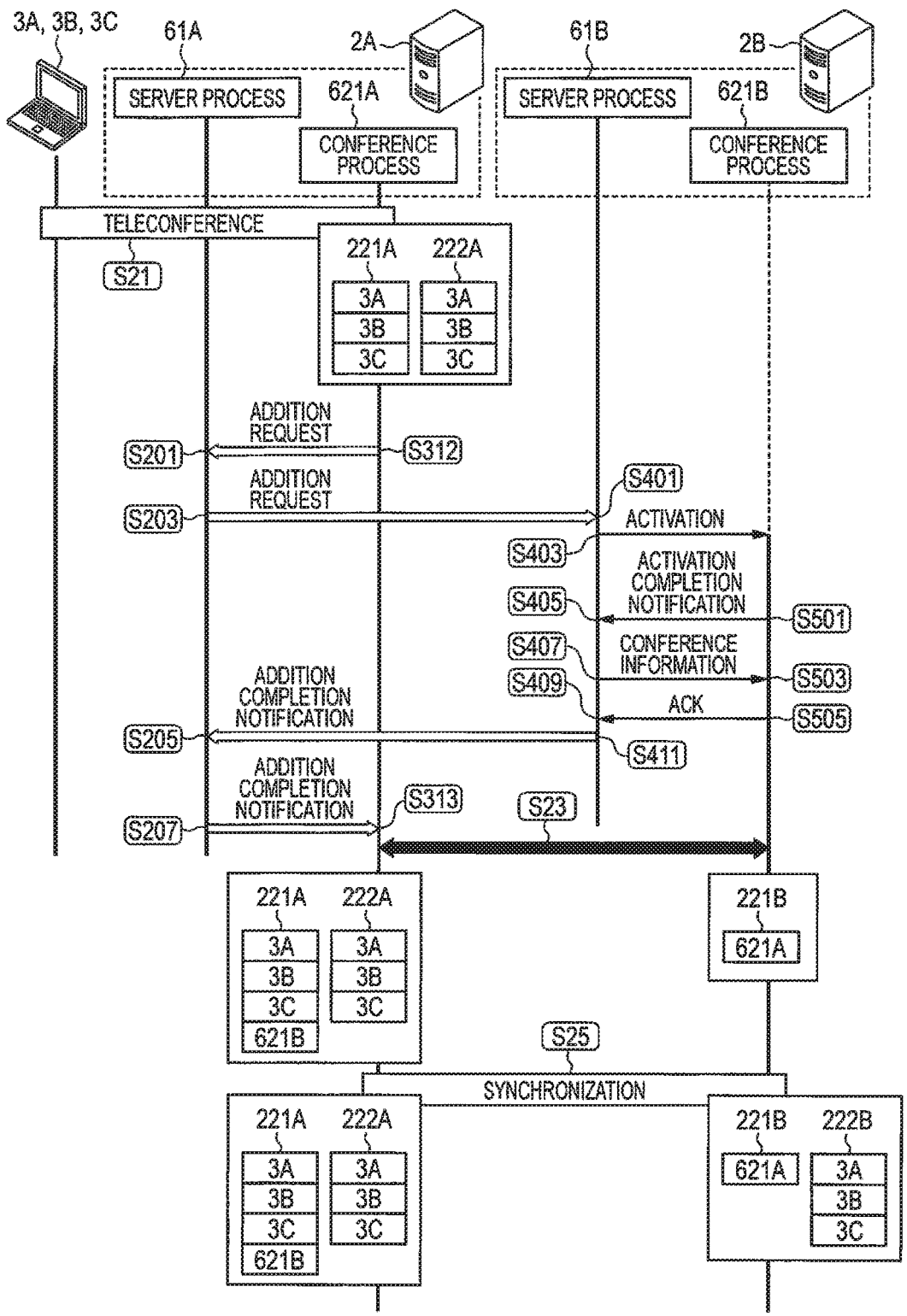
FIG. 4 shows the first communication sequence and is continued from FIG. 3.

As shown in FIG. 4, the conference room 30 is performed among the clients 3A to 3C (S21). For example, the conference process 621A receives the conference data of the conference room 30 transmitted from the client 3A. The conference process 621A refers to the table 221A and specifies the clients 3B, 3C with which the sessions are directly connected. The conference process 621A transmits the conference data received from the client 3A, to the specified clients 3B, 3C. In this way, the clients 3A to 3C transmit and receive the conference data through the conference process 621A.

A case where a processing load of the controller 21A of the conference server 2A has increased will be described as an example. In this case, in response to delay of the processing of the conference process 621A, smooth proceeding of the conference room 30 performed through the conference process 621A may be inhibited. Thus, the conference process 621A performs communication by following communication procedures in order to perform the conference room 30 by the plurality of conference processes 62 including the conference process 621A.

The conference process 621A transmits an addition request to the server process 61A in order to request addition of another conference process 62 that performs the conference room 30 (S312). The server process 61A receives the addition request (S201). The server process 61A transmits the addition request to the server process 61B of the conference server 2B (S203). The server process 61B receives the addition request (S401).

The server process 61B activates the conference process 621B that performs the conference room 30 (S403). The conference process 621B transmits activation completion notification for notifying the completion of the activation, to the server process 61B (S501). The server process 61B receives the activation completion notification (S405). The server process 61B transmits conference information required for performing the conference room 30, to the conference process 621B (S407). The conference information includes the conference ID "30" indicating the conference room 30, the setting information on the conference room 30, and the client information (the client ID, the IP address, and so on) on the clients 3A to 3C that request participation in the conference room 30. The conference process 621B receives the conference information (S503). The conference process 621B performs setting processing based on the conference information so that the conference room 30 can be performed. The conference process 621B transmits ACK for notifying that the setting processing is completed, to the server process 61B (S505). The server process 61B receives the ACK (S409).

The server process 61B transmits addition completion notification for notifying that the activation of the conference process 621B is completed, to the server process 61A (S411). The server process 61A receives the addition completion notification (S205). The server process 61A transmits the addition completion notification to the conference process 621A (S207). The conference process 621A receives the addition completion notification (S313). Thereby, the session is connected between the conference processes 621A and 621B (S23).

The conference process 621A associates the conference process ID "621B" of the conference process 621B with which the session is connected, the apparatus type "server", and the IP address of the conference server 2B in which the conference process 621B is executed, and stores the associated information in the table 221A. The conference process 621B associates the conference process ID "621A" of the conference process 621A with which the session is connected, the apparatus type "server", and the IP address of the conference server 2A in which the conference process 621A is executed, and stores the associated information in the table 221B.

The tables 221, 222 (see FIG. 2) are transmitted and received between the conference processes 621A, 621B, and thereby, the tables 221, 222 are synchronized (S25). Hereinafter, communication of the tables 221, 222 performed for synchronization is referred to as "synchronizing communication". There is no client 3 yet that has the session directly connected with the conference process 621B. Thus, the tables 221A, 222A of the conference process 621A and the table 221B (see FIG. 2) of the conference process 621B are not changed by the synchronizing communication. On the other hand, the table 222B of the conference process 621B is updated by the synchronizing communication. Specifically, the client IDs "3A", "3B", "3C" of the clients 3A to 3C, the ID "621A" of the conference process 621A, and the application type of the clients 3A to 3C are added to the table 222B of the conference process 621B by synchronizing communication, based on the information stored in the tables 221A, 222A of the conference process 621A. That is, in the synchronizing communication, the client IDs "3A", "3B", "3C" of the clients 3A to 3C having a session directly connected with the conference process 621A are added to the table 222B, such that the information in the table 222A and the information in the table 222B become the same (that is, the client IDs "3A", "3B", "3C" in the both tables 222A, 222B).

Figure 5:
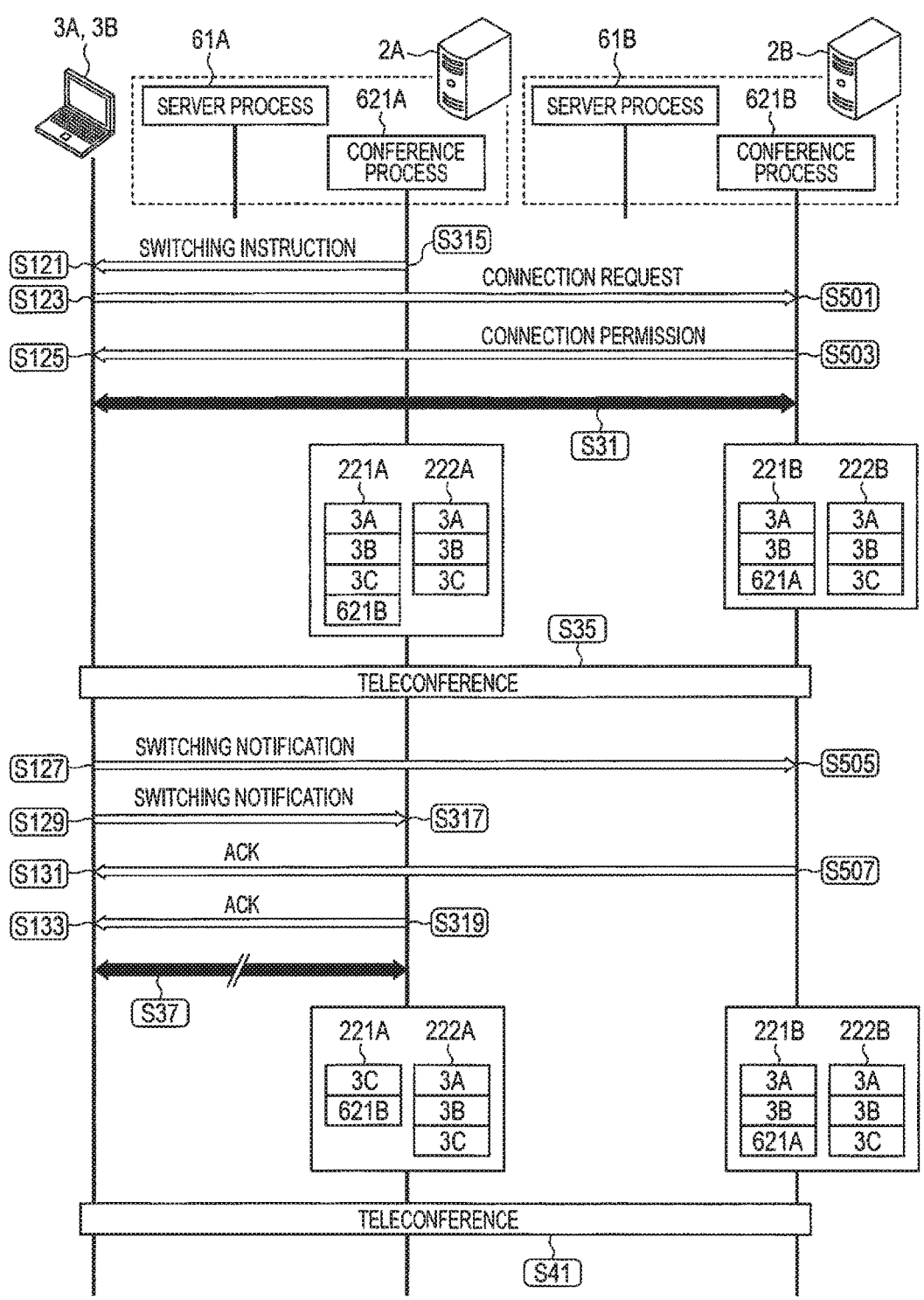
FIG. 5 shows the first communication sequence and is continued from FIG. 4.

As shown in FIG. 5, in order to switch a connection destination of the session from the conference process 621A to the conference process 621B for some (for example, the clients 3A, 3B) of the clients 3A to 3C with which the sessions are connected, the conference process 621A transmits a switching command to the clients 3A, 3B (S315). The controllers 31A, 31B of the clients 3A, 3B receive the switching command (S121).

The controllers 31A, 31B transmit a connection request for requesting the connection with the conference process 621B, to the conference process 621B (S123). The conference process 621B receives the connection request (S501). When permitting the connection of the session with the clients 3A, 3B, the conference process 621B transmits, to the clients 3A, 3B, connection permission for permitting the connection of the session (S503). The controllers 31A, 31B of the clients 3A, 3B receive the connection permission (S125). Thereby, the session is connected between the clients 3A, 3B and the conference process 621B (S31).

Figure 6:
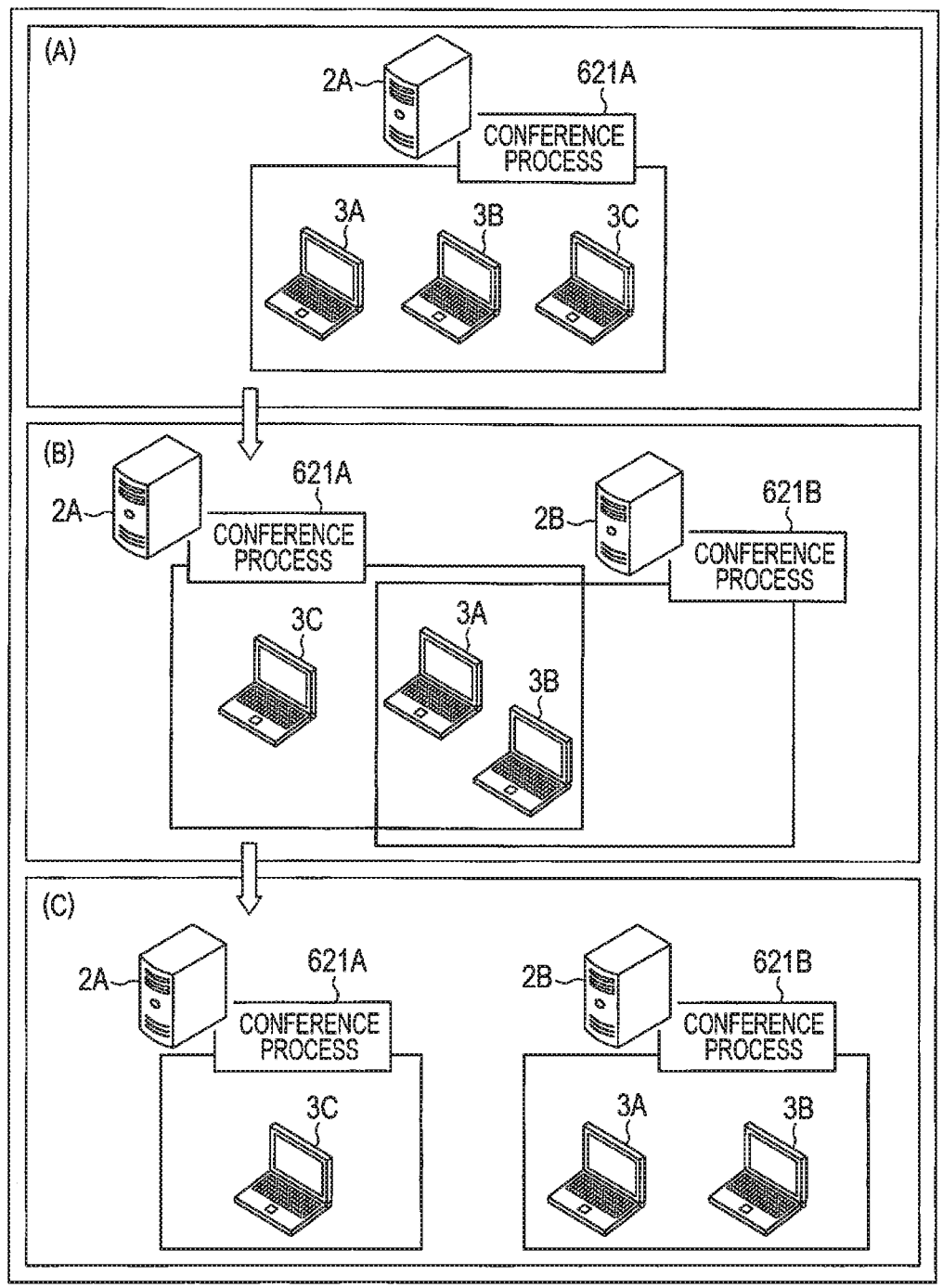
FIG. 6 is a diagram showing a change in a connection state of sessions in the first communication sequence.

That is, as shown in FIG. 6, the communication system 1 is switched from a state (A) where the sessions are connected between the conference process 621A and the clients 3A to 3C to a state (B) where the sessions between both the conference processes 621A, 621B and the clients 3A, 3B are connected and the session between the conference process 621A and the client 3C is connected.

The conference process 621B associates the client IDs "3A", "3B", of the clients 3A, 3B with which the sessions are connected, the apparatus type "client", and the IP addresses of the clients 3A, 3B, and stores the associated information in the table 221B. The conference process 621B changes the conference process IDs corresponding to the client IDs "3A", "3B" among the items in the table 222B, from "621A" to "621B".

The conference room 30 is performed among the clients 3A to 3C (S35). For example, the client 3A transmits the conference data of the conference room 30 to one of the conference processes 621A, 621B. For example, to which one of the conference processes 621A, 621B the conference data should be transmitted may be determined randomly. When receiving the conference data from the client 3A, the conference process 621A refers to the table 221A and specifies the clients 3B, 3C with which the sessions are directly connected. The conference process 621A transmits the conference data received from the client 3A to the specified clients 3B, 3C.

When receiving the conference data from the client 3A, the conference process 621B refers to the table 221B and specifies the client 3B with which the session is directly connected. The conference process 621B transmits the conference data received from the client 3A to the specified client 3B. On the other hand, the conference process 621B refers to the table 222B and specifies the conference process 621A corresponding to the client 3C. The conference process 621B transmits the conference data received from the client 3A to the specified conference process 621A. The conference process 621A transmits the conference data received from the conference process 621B to the client 3C.

As described above, the client 3A transmits the conference data to other clients 3B, 3C that participate in the conference room 30, regardless of whether the destination of the conference data is the conference process 621A or the conference process 621B. Because the conference process 621B that relays the conference data of the conference room 30 is added, the processing load of the conference process 621A is decreased.

Communication procedures for a case where the sessions between the clients 3A, 3B and the conference process 621A are disconnected will be described. The controllers 31A, 31B of the clients 3A, 3B transmit a switching notification for notifying that the connection destination of the session is switched from the conference process 621A to the conference process 621B, to the conference processes 621A, 621B (S127, S129). The conference process 621A receives the switching notification (S317) and transmits ACK to the clients 3A, 3B (S319). The conference process 621B receives the switching notification (S505) and transmits ACK to the clients 3A, 3B (S507). The controllers 31A, 31B of the clients 3A, 3B receive the ACK from the conference processes 621A, 621B (S131, S133). Thereby, the sessions between the clients 3A, 3B and the conference process 621A are disconnected (S37).

That is, as shown in FIG. 6, the communication system 1 is switched from the state (B) where the sessions between both the conference processes 621A and 621B and the clients 3A, 3B are connected and the session between the conference process 621A and the client 3C is connected to a state (C) where the sessions between the conference process 621A and the client 3C is connected and the sessions between the conference process 621B and the clients 3A, 3B are connected.

The conference process 621A deletes the client IDs "3A", "3B" of the clients 3A, 3B with which the sessions are disconnected and the apparatus type and the IP address corresponding to the client IDs, among the items in the table 221A. The conference process 621A changes the conference process IDs associated with the client IDs "3A", "3B" among the items in the table 221B, to the conference process ID "621B" of the conference process 621B with which the session is newly connected.

The conference room 30 is performed among the clients 3A to 3C (S41). For example, the client 3A transmits the conference data of the conference room 30 to the conference process 621B. When receiving the conference data from the client 3A, the conference process 621B refers to the table 221B and specifies the client 3B with which the session is directly connected. The conference process 621B transmits the conference data received from the client 3A to the specified client 3B. On the other hand, the conference process 621B refers to the table 222B and specifies the conference process 621A corresponding to the client 3C. The conference process 621B transmits the conference data received from the client 3A to the specified conference process 621A. The conference process 621A transmits the conference data received from the conference process 621B to the client 3C.

As described above, even after the sessions between the clients 3A, 3B and the conference process 621A are disconnected, communication of the conference data among the clients 3A to 3C participating in the conference room 30 can be performed. The client 3 having the session directly connected with the conference process 621A is only the client 3C. Thus, the processing load of the conference process 621A is further decreased.

In the first communication sequence, first, the sessions between the conference process 621A and the clients 3A to 3C are connected (S13 and so on). In this case, the conference process 621A performs the teleconference based on the tables 221A, 222A (S21). Next, the server process 61A causes the server process 61B to activate the conference process 621B in response to the request (S201) from the conference process 621A (S403 to S409, and S501 to S505). Then, the synchronizing communication for synchronizing the tables 221, 222 is performed between the conference processes 621A and 621B (S25). Next, the sessions between the conference process 621B and the clients 3A, 3B are connected (S31). The conference process 621B performs the teleconference based on the tables 221B, 222B (S35). In this case, the conference process 621B can smoothly perform the teleconference based on the tables 221B, 222B updated by the synchronizing communication (S25).

Until the sessions between the clients 3A, 3B and the conference process 621A is disconnected by the processing at S37, the teleconference among the clients 3A to 3C is performed by the conference processes 621A, 621B (S35). In this way, in the communication system 1, the teleconference among the clients 3A to 3C is performed by the plurality of conference processes 62 (the conference processes 621A, 621B). In this case, for example, even when the processing load of the controller 21A that executes the conference process 621A increases, the conference process 621B executed by the controller 21B connects with some of the clients 3A to 3C to perform the teleconference, and thereby, the load of the controller 21A can be decreased.

In the first communication sequence, after the sessions between the clients 3A, 3B and the conference process 621B is connected (S31), the sessions between the clients 3A, 3B and the conference process 621A is disconnected (S37). In this case, a state is established where the client 3C connects the session with the conference process 621A and the clients 3A, 3B connect the sessions with the conference process 621B (see FIG. 6(C)). In this case, the load of the controller 21A that executes the conference process 621A can be further decreased. The clients 3A to 3C having had the sessions connected with the conference process 621A are divided into the client 3C having the session connected with the conference process 621A and the clients 3A, 3B having the sessions connected with the conference process 621B. Thus, the communication system 1 divides the conference room 30 in which the clients 3A to 3C participate into the conference room in which the client 3C connected to the conference process 621A participates and the conference room in which the clients 3A, 3B connected to the conference process 621B participate.

<Modification of First Communication Sequence>

Figure 7:
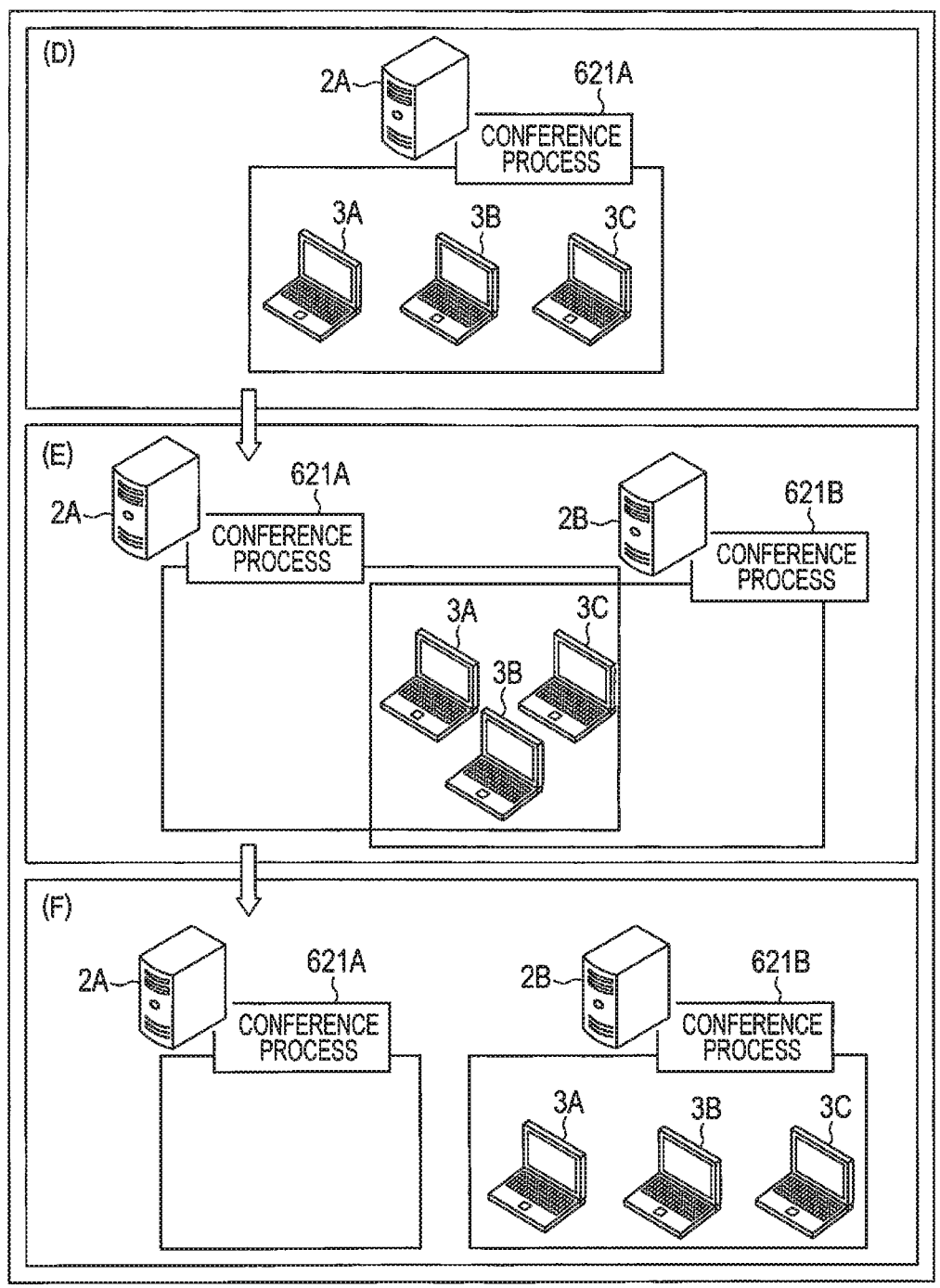
FIG. 7 is a diagram showing a change in a connection state of sessions in a modification.

In the processing at S315 of the first communication sequence, the conference process 621A may transmit a switching command to the clients 3A to 3C in order to switch the connection destination of the session for all of the clients 3A to 3C from the conference process 621A to the conference process 621B (S315). Thereby, the session may be connected between the clients 3A to 3C and the conference process 621B (S31). That is, as shown in FIG. 7, the communication system 1 may be switched from a state (D) where the sessions are connected between the conference process 621A and the clients 3A to 3C, to a state (E) where the sessions are connected between both the conference processes 621A, 621B and the clients 3A to 3C.

Further, the controllers 31A to 31C of the clients 3A to 3C may perform communication for switching the connection destination of the session from the conference process 621A to the conference process 621B (S127, S129, S131, S133). Thereby, the sessions between the clients 3A to 3C and the conference process 621A may be disconnected (S37). That is, as shown in FIG. 7, the communication system 1 may be switched from the state (E) where the sessions are connected between both the conference processes 621A, 621B and the clients 3A to 3C, to a state (F) where the sessions between the conference process 621B and the clients 3A to 3C are connected and the sessions between the conference process 621A and the clients 3A to 3C are disconnected.

In the modification described above, in the communication system 1, all of the clients 3A to 3C having the sessions connected with the conference process 621A are connected to the conference process 621B and the sessions between the conference process 621A and the clients 3A to 3C are disconnected. In this case, the conference process 62 that performs the teleconference is shifted from the conference process 621A to the conference process 621B.

In the case described above, after the sessions between the conference process 621A and the clients 3A to 3C are disconnected, the conference process 621A may be terminated by the server process 61A. Alternatively, when all the sessions with the client 3 are disconnected, the conference process 621A may terminate the processing by itself.

<Overview of Second Communication Sequence (Information Distribution)

A second communication sequence will be described with reference to FIG. 8. As shown in FIG. 1, it is assumed that the sessions are connected between the conference process 621A and the clients 3A to 3C, the sessions are connected between the conference process 621B and the clients 3D, 3E, and the session is connected between the conference process 621C and the client 3F. The clients 3A to 3F participate in a common conference room 30. In this case, pieces of information are stored in the tables 221A, 222A of the conference process 621A and the tables 221B, 222B of the conference process 621B as shown in FIG. 2. The assumption described above is applied also to a third communication sequence (see FIG. 9) described later.

Figure 8:
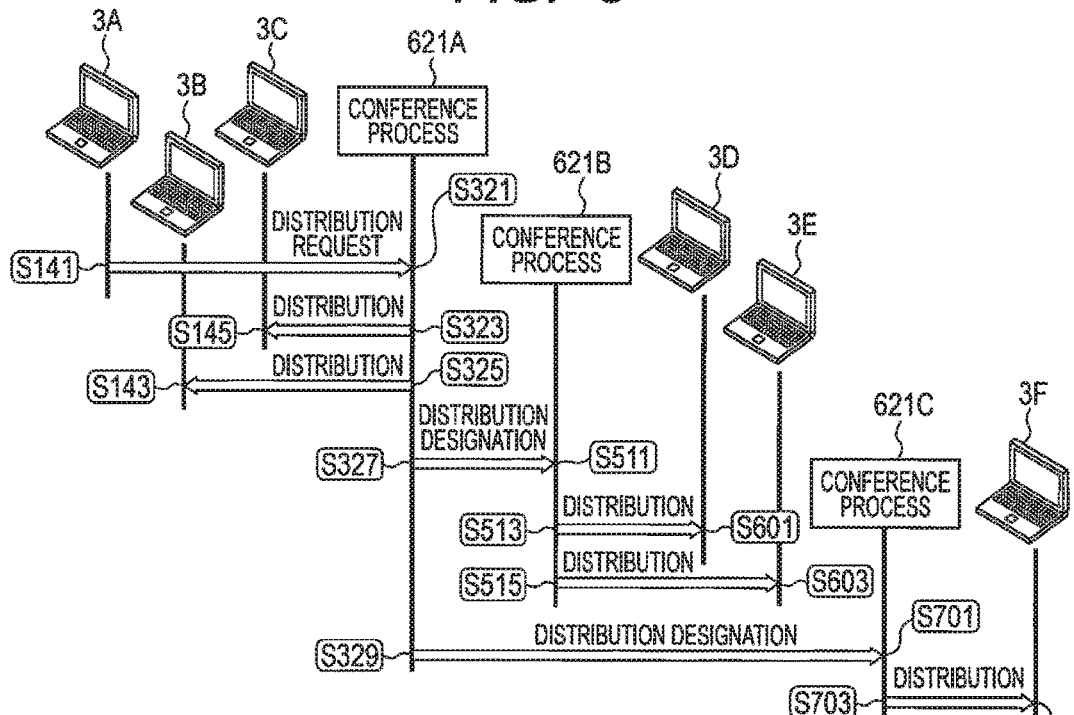
FIG. 8 is a diagram showing a second communication sequence.

As shown in FIG. 8, the controller 31A of the client 3A transmits a distribution request for distribution of the conference data (referred to as "distribution data") to all other clients 3B to 3F participating in the conference room 30, to the conference process 621A with which the session is connected (S141). Examples of the distribution data include data of video and audio data related to the conference room 30. The distribution request includes the distribution data. The conference process 621A receives the distribution request (S321).

The conference process 621A refers to the table 221A (see FIG. 2) to specify the clients 3B, 3C excluding the client 3A that has transmitted the distribution request. The conference process 621A transmits the distribution data to the specified clients 3B, 3C (S323, S325). The controller 31B of the client 3B receives the distribution data (S143). The controller 31C of the client 3C receives the distribution data (S145).

The conference process 621A refers to the table 222A (see FIG. 2) to specify the clients 3D to 3F based on the client IDs associated with the conference process IDs "621B", "621C" excluding the conference process ID "621A". The conference process 621A further specifies the conference process 621B based on the conference process IDs associated with the client IDs "3D", "3E" and specifies the conference process 621C based on the conference process ID associated with the client ID "3F".

The conference process 621A transmits distribution designation designating the clients 3D, 3E, to the specified conference process 621B (S327). The conference process 621A transmits the distribution designation designating the client 3F, to the specified conference process 621C (S329). The distribution designation includes the distribution data. The conference process 621B receives the distribution designation (S511). The conference process 621C receives the distribution designation (S701).

The conference process 621B refers to the table 221B (see FIG. 2) to specify the clients 3D, 3E designated by the distribution designation. The conference process 621B transmits the distribution data to the specified clients 3D, 3E (S513, S515). The controller 31D of the client 3D receives the distribution data (S601). The controller 31E of the client 3E receives the distribution data (S603). The conference process 621C refers to the table 221 (not shown) to specify the client 3F designated by the distribution designation. The conference process 621C transmits the distribution data to the specified client 3F (S703). The controller 31F of the client 3F receives the distribution data (S801).

As described above, in the second communication sequence, the client 3A transmits the distribution request to the conference process 621A with which the session is directly connected (S141). The conference process 621A specifies the clients 3B, 3C that have the sessions directly connected with the conference process 621A, based on the table 221A. Therefore, the conference process 621A transmits the distribution data to the specified clients 3B, 3C. Therefore, the client 3A transmits the distribution data to the clients 3B, 3C that have the sessions directly connected with the conference process 621A by transmitting the distribution request to the conference process 621A.

The conference process 621A specifies the conference processes 621B, 621C that have the sessions connected with the clients 3D to 3F, based on the table 222A. The conference process 621A transmits the distribution designation designating the client 3 that is the destination, to the specified conference processes 621B, 621C (S327, S329). Thereby, the conference processes 621B, 621C having received the distribution designation transmit the distribution data to the clients 3D to 3F with which the sessions are directly connected (S513, S515, S703). Therefore, the client 3A also transmits the distribution data to the clients 3D to 3F having no session directly connected with the conference process 621A, by transmitting the distribution request to the conference process 621A.

<Overview of Third Communication Sequence (Inquiry)>

Figure 9:
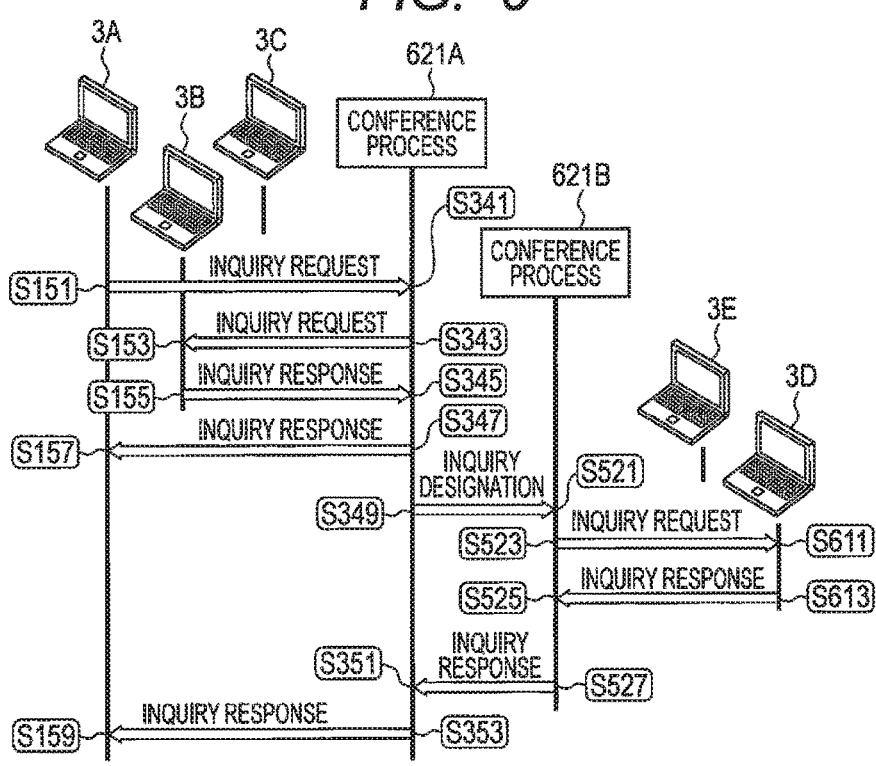
FIG. 9 is a diagram showing a third communication sequence.

A third communication sequence will be described with reference to FIG. 9. The controller 31 of the client 3A transmits an inquiry request for inquiring setting information and so on of the conference room 30 to the clients 3B, 3D participating in the conference room 30, to the conference process 621A (S151). The inquiry request includes the client IDs "3B", "3D" of the clients 3B, 3D that are the destination. The conference process 621A receives the inquiry request (S341).

The conference process 621A refers to the table 221A (see FIG. 2) to specify the client 3B corresponding to the client ID included in the inquiry request. The conference process 621A refers to the table 222A (see FIG. 2) to specify the conference process 621B based on the conference process ID associated with the client 3D included in the inquiry request.

The conference process 621A transmits the inquiry request to the specified client 3B (S343). The controller 31B of the client 3B receives the inquiry request (S153). The controller 31B transmits an inquiry response including information that is inquired, to the conference process 621A (S155). The conference process 621A receives the inquiry response (S345). The conference process 621A transmits the received inquiry response to the client 3A (S347). The controller 31A of the client 3A receives the inquiry response (S157) and acquires information included in the inquiry response.

The conference process 621A transmits inquiry designation designating the client 3D, to the specified conference process 621B (S349). The conference process 621B receives the inquiry designation (S521). The conference process 621B refers to the table 221B (see FIG. 2) to specify the client 3D designated by the inquiry designation. The conference process 621B transmits an inquiry request to the specified client 3D (S523). The controller 31D of the client 3D receives the inquiry request (S611). The controller 31D transmits an inquiry response including information that is inquired, to the conference process 621B (S613). The conference process 621B receives the inquiry response (S525). The conference process 621B transmits the received inquiry response to the conference process 621A (S527). The conference process 621A receives the inquiry response (S351). The conference process 621A transmits the received inquiry response to the client 3A (S353). The controller 31A of the client 3A receives the inquiry response (S159) and acquires information included in the inquiry response.

As described above, in the third communication sequence, the client 3A transmits the inquiry request designating the clients 3B, 3D from which acquisition of information is requested, to the conference process 621A (S151). In this case, the conference process 621A acquires the information from the client 3B by transmitting the inquiry request to the client 3B with which the session is connected (S343). On the other hand, the conference process 621A acquires the information from the client 3D with which the session is not directly connected, through the conference process 621B. Therefore, the client 3A acquires the information from the clients 3B, 3D regardless of whether the sessions between the clients 3B, 3D and the conference process 621A are connected, by transmitting the inquiry request to the conference process 621A.

<Overview of Fourth Communication Sequence (Determination of Participation Authority)>

Figure 10:
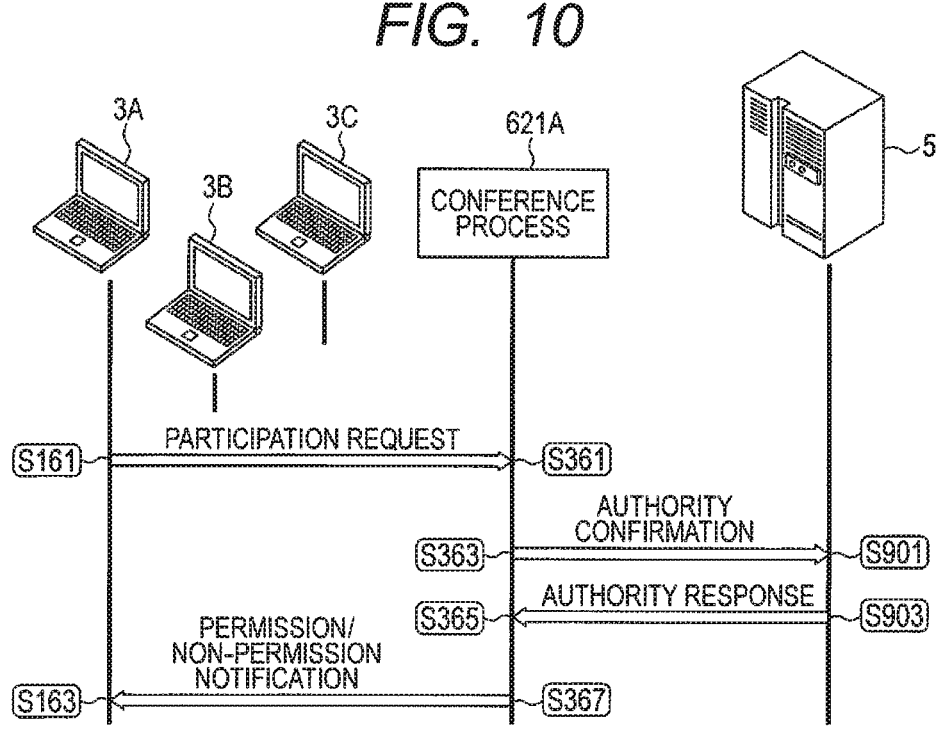
FIG. 10 is a diagram showing a fourth communication sequence.

A fourth communication sequence will be described with reference to FIG. 10. It is assumed that the sessions are connected between the clients 3B, 3C and the conference process 621A and the conference room 30 is being performed. This assumption is applied also to a fifth communication sequence (see FIG. 11) described later.

The controller 31A of the client 3A transmits a participation request for requesting participation in the conference room 30, to the conference process 621A (S161). The conference process 621A receives the participation request (S361). The conference process 621A transmits an authority confirmation to the DB server 5 in order to confirm whether the client 3A having transmitted the participation request has the authority to participate in the conference room 30 (S363). The authority confirmation includes the client ID "3A" of the client 3A and the conference ID "30" of the conference room 30. The controller of the DB server 5 receives the authority confirmation (S901).

The controller of the DB server 5 acquires the client ID "3A" and the conference room ID "30" included in the authority confirmation. The controller of the DB server 5 determines whether the client 3A has the authority to participate in the conference room 30. Specifically, when the client ID "3A" is stored in a participation authority DB stored in the memory, in association with the conference room ID "30", the controller of the DB server 5 determines that the client 3A has the authority to participate in the conference room 30. On the other hand, when the client ID "3A" associated with the conference room ID "30" is not stored in the participation authority DB stored in the memory, the controller of the DB server 5 determines that the client 3A does not have the authority to participate in the conference room 30. The controller of the DB server 5 transmits an authority response including a determination result to the conference process 621A (S903). The conference process 621A receives the authority response (S365).

The conference process 621A determines whether the participation in the conference room 30 is permitted or forbidden based on the determination result included in the authority response. The conference process 621A transmits a permission/non-permission notification indicating whether the participation in the conference room 30 is permitted or forbidden, to the client 3A (S367). The controller 31A of the client 3A receives the permission/non-permission notification (S163).

When the client 3A is permitted to participate in the conference room 30, the session between the client 3A and the conference process 621A is connected and the teleconference starts. On the other hand, when the client 3A is denied for participation in the conference room 30, the session between the client 3A and the conference process 621A is not connected and the teleconference does not start.

As described above, when receiving the participation request from the client 3, the conference process 621A determines whether to allow the client 3 to participate in the conference room, by making an inquiry to the DB server 5. When the fourth communication sequence is executed, determination whether the client 3 is allowed to participate in the teleconference is performed by the DB server 5 collectively. Therefore, for example, even when the participation authority DB is updated frequently, determination on whether the participation is permitted based on the participation authority DB after update can be performed quickly by making an inquiry to the DB server.

<Overview of Fifth Communication Sequence (History Notification)>

Figure 11:
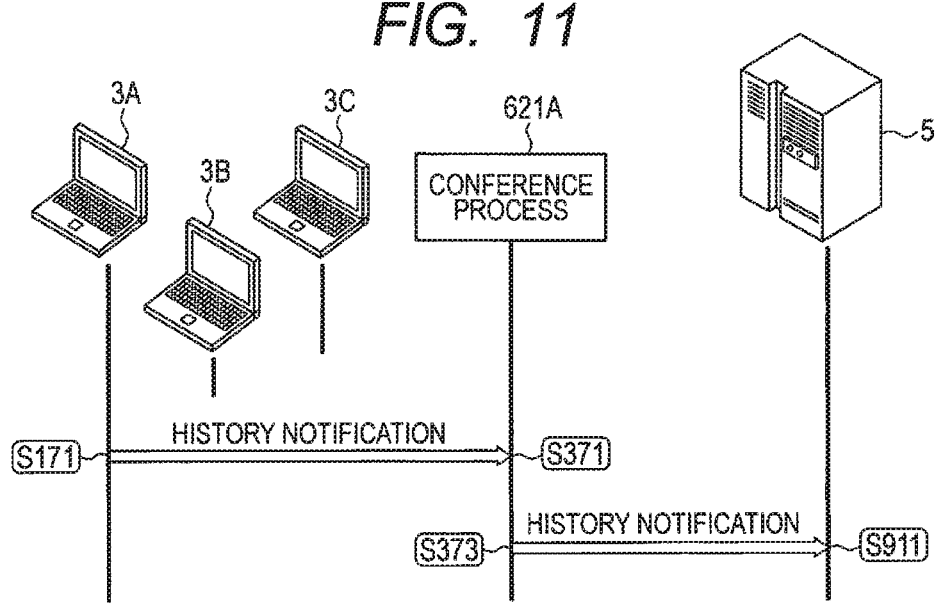
FIG. 11 is a diagram showing a fifth communication sequence.

A fifth communication sequence will be described with reference to FIG. 11. The controller 31A of the client 3A transmits a history notification to the conference process 621A in order to notify communication history in the conference room 30 (S171). The history notification includes information indicating the communication history in the client 3A. The conference process 621A receives the history notification (S371). The conference process 621A transmits the received history notification to the DB server 5 (S373). The controller of the DB server receives the transmitted history notification (S911). The controller of the DB server 5 stores the information indicating the communication history included in the received history notification, in the memory (not shown).

As described above, when the fifth communication sequence is executed, the DB server 5 manages not only the participation authority DB but also the history information on the client 3. Therefore, for example, the controller of the DB server 5 may specify communication frequency of the client 3 based on the communication history to specify the conference process 62 that performs the conference room in which the client 3 having large communication frequency participates. The DB server 5 may cause this conference process 62 performing the conference room to transmit an addition request (S312) in order to add a conference process 62 to perform the conference room.

While the disclosure has been described in detail with reference to the above aspects thereof, it would be apparent to those skilled in the art that various changes and modifications may be made therein without departing from the scope of the claims.

For example, in the first communication sequence, the conference process 621A transmits the addition request to the server process 61A (S312). The server process 61A receives the addition request (S201) and transmits the addition request to the server process 61B of the conference server 2B (S203). The server process 61B receives the addition request (S401) and activates the conference process 621B that performs the conference room 30 (S403). On the other hand, the server process 61A may activate a new conference process 62 that performs the conference room 30, within the conference server 2A. The conference server 2 that activates the new conference process 62 may be switched in response to the processing load of the controller 21A of the conference server 2A. The number of the conference processes 62 that are newly activated is not limited to one and may be plural.

In the first communication sequence, when the conference room 30 is performed in a state where the clients 3A, 3B have connected the sessions with the conference processes 621A, 621B, respectively (S35), the clients 3A, 3B may determine through which of the conference processes 621A, 621B the communication is to be performed. For example, the clients 3A, 3B may acquire a state of the processing load of the controllers 21A, 21B of the conference servers 2A, 2B to determine the conference process 62 executed in the controller having a smaller processing load.

In the second communication sequence, the client 3A transmits the distribution request to the conference process 621A (S141). For example, when the sessions between the conference processes 621A, 621B, 621C and the client 3A are connected, the client 3A may transmit the distribution request to all of the conference processes 621A, 621B, 621C. In this case, the distribution data is transmitted to the clients 3A to 3F without performing communication of the distribution designation among the conference processes 621A, 621B, 621C.

In the fourth communication sequence, when receiving the participation request (S361), the conference process 621A transmits the authority confirmation to the DB server 5 (S363) to request determination whether the client 3A has the authority to participate in the conference room 30. Alternatively, the conference process 621A itself may perform determination on whether the client 3A has the authority to participate in the conference room 30. Alternatively, the conference process 621A may request determination whether the client 3A has the authority to participate in the conference room 30 by transmitting the authority confirmation to another conference process 62.

In the first communication sequence, the clients 3A, 3B disconnects the sessions with the conference process 621A (S37) after the sessions with the conference process 621B are connected. Alternatively, the sessions between the clients 3A, 3B and the conference process 621A may be maintained even after the sessions between the clients 3A, 3B and the conference process 621B are connected. When, for example, a state of the sessions with the conference process 621B becomes unstable, the clients 3A, 3B may restore the sessions between the clients 3A, 3B and the conference process 621A again and disconnect the sessions with the conference process 621B that has become unstable.

What is claimed is:

1. A communication method for performing a teleconference between clients through a server, the communication method comprising:
executing, by the server, a first conference process that is a conference process for performing the teleconference;
connecting each of first and second clients with the first conference process;
after connecting each of the first and second clients with the first conference process, performing the teleconference between the first client and the second client through the first conference process, based on first information relating to a conference process and a client that perform communication with the first conference process;
after connecting each of the first and second clients with the first conference process, transmitting an addition request from the first conference process to the server, the addition request being for activating a second conference process different from the first conference process;
in response to receiving the addition request, activating the second conference process by the server;
synchronizing the first information with second information, the second information relating to a conference process and a client that perform communication with the second conference process;
after synchronizing the first information with the second information, transmitting a switching instruction from the first conference process to the second client, the switching instruction being for switching a connection destination from the first conference process to the second conference process;
in response to receiving the switching instruction, connecting the second client with the second conference process; and
after connecting the second client with the second conference process, performing the teleconference by the second client through the second conference process, based on the second information,
wherein the first information includes:
a first table including information on a conference process and a client that have a session directly connected with the first conference process; and
a second table including information on a client that has a session directly connected with the first conference process and information on a client that has a session connected with the first conference process through a conference process other than the first conference process; and
wherein the second information includes:
a third table including information on a conference process and a client that have a session directly connected with the second conference process; and
a fourth table including information on a client that has a session directly connected with the second conference process and information on a client that has a session connected with the second conference process through a conference process other than the second conference process.

2. The communication method according to claim 1, wherein the first client includes a plurality of first clients, the communication method further comprising:
transmitting distribution data from one of the plurality of first clients to the first conference process, the distribution data being data distributed to another one of the plurality of first clients; and
in response to receiving the distribution data by the first conference process, transmitting the distribution data from the first conference process to the other one of the plurality of first clients based on the first information.

3. The communication method according to claim 2, further comprising:
transmitting designation data from the first conference process to the second conference process based on the first information, the designation data being the distribution data designating the second client as a transmission destination; and
in response to receiving the designation data by the second conference process, transmitting the designation data from the second conference process to the second client based on the second information.

4. The communication method according to claim 1, further comprising:
   transmitting a participation request from a third client to the first conference process, the participation request being for participation in the teleconference;
   after transmitting the participation request to the first conference process, confirming whether to permit the participation in the teleconference between the first conference process and a management server; and
   transmitting a confirmation result from the first conference process to the third client, the confirmation result being a result of confirming whether to permit the participation.

5. The communication method according to claim 1, further comprising:
   after connecting the second client with the second conference process, disconnecting connection between the first conference process and the second client.

6. The communication method according to claim 5, further comprising:
   transmitting the switching instruction to the first client and the second client;
   connecting each of the first and second clients with the second conference process;
   performing the teleconference between the first client and the second client through the second conference process; and
   disconnecting connection between each of the first and second clients and the first conference process.

7. The communication method according to claim 1, wherein the synchronizing includes adding, to the fourth table, the information on the client that has a session directly connected with the first conference process such that the information in the second table and the information in the fourth table become same.

8. A non-transitory computer-readable storage medium storing a communication program, the communication program being executable on a computer of a server that performs a teleconference between clients, the communication program causing, when executed, the server to perform operations comprising:
   executing a first conference process that is a conference process for performing the teleconference;
   connecting each of first and second clients with the first conference process;
   after connecting each of the first and second clients with the first conference process, performing the teleconference between the first client and the second client through the first conference process, based on first information relating to a conference process and a client that perform communication with the first conference process;
   after connecting each of the first and second clients with the first conference process, transmitting an addition request from the first conference process, the addition request being for activating a second conference process different from the first conference process;
   in response to receiving the addition request, activating the second conference process;
   synchronizing the first information with second information, the second information relating to a conference process and a client that perform communication with the second conference process;
   after synchronizing the first information with the second information, transmitting a switching instruction from the first conference process to the second client, the switching instruction being for switching a connection destination from the first conference process to the second conference process;
   in response to receiving the switching instruction, connecting the second client with the second conference process; and
   after connecting the second client with the second conference process, performing the teleconference by the second client through the second conference process, based on the second information,
   wherein the first information includes:
      a first table including information on a conference process and a client that have a session directly connected with the first conference process; and
      a second table including information on a client that has a session directly connected with the first conference process and information on a client that has a session connected with the first conference process through a conference process other than the first conference process; and
   wherein the second information includes:
      a third table including information on a conference process and a client that have a session directly connected with the second conference process; and
      a fourth table including information on a client that has a session directly connected with the second conference process and information on a client that has a session connected with the second conference process through a conference process other than the second conference process.

9. The non-transitory computer-readable storage medium according to claim 8, wherein the communication program further causes, when executed, the server to perform operations comprising:
   after connecting the second client with the second conference process, disconnecting connection between the first conference process and the second client.

10. The non-transitory computer-readable storage medium according to claim 9, wherein the communication program further causes, when executed, the server to perform operations comprising:
   transmitting the switching instruction to the first client and the second client;
   connecting each of the first and second clients with the second conference process;
   performing the teleconference between the first client and the second client through the second conference process; and
   disconnecting connection between each of the first and second clients and the first conference process.

11. A communication method for performing a teleconference between clients through a server, the communication method comprising:
   executing, by the server, a first conference process that is a conference process for performing the teleconference;
   connecting each of first and second clients with the first conference process;
   after connecting each of the first and second clients with the first conference process, performing the teleconference between the first client and the second client through the first conference process, based on first information relating to a conference process and a client that perform communication with the first conference process;

after connecting each of the first and second clients with the first conference process, transmitting an addition request from the first conference process to the server, the addition request being for activating a second conference process different from the first conference process;

in response to receiving the addition request, activating the second conference process by the server;

synchronizing the first information with second information, the second information relating to a conference process and a client that perform communication with the second conference process;

after synchronizing the first information with the second information, transmitting a switching instruction from the first conference process to the second client, the switching instruction being for switching a connection destination from the first conference process to the second conference process;

in response to receiving the switching instruction, connecting the second client with the second conference process; and after connecting the second client with the second conference process, performing the teleconference by the second client through the second conference process, based on the second information, wherein the first client includes a plurality of first clients, the communication method further comprising:

transmitting distribution data from one of the plurality of first clients to the first conference process, the distribution data being data distributed to another one of the plurality of first clients;

in response to receiving the distribution data by the first conference process, transmitting the distribution data from the first conference process to the other one of the plurality of first clients based on the first information, and transmitting designation data from the first conference process to the second conference process based on the first information, the designation data being the distribution data designating the second client as a transmission destination; and in response to receiving the designation data by the second conference process, transmitting the designation data from the second conference process to the second client based on the second information.

\* \* \* \* \*